United States Patent
Huang et al.

(10) Patent No.: US 11,544,898 B2
(45) Date of Patent: Jan. 3, 2023

(54) METHOD, COMPUTER DEVICE AND STORAGE MEDIUM FOR REAL-TIME URBAN SCENE RECONSTRUCTION

(71) Applicant: SHENZHEN UNIVERSITY, Guangdong (CN)

(72) Inventors: Hui Huang, Shenzhen (CN); Yilin Liu, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 17/474,177

(22) Filed: Sep. 14, 2021

(65) Prior Publication Data

US 2022/0351463 A1  Nov. 3, 2022

(30) Foreign Application Priority Data

Apr. 29, 2021  (CN) .......................... 202110474636.X

(51) Int. Cl.
*G06T 17/00* (2006.01)
*G06V 20/00* (2022.01)

(52) U.S. Cl.
CPC .............. *G06T 17/00* (2013.01); *G06V 20/00* (2022.01)

(58) Field of Classification Search
CPC . G06T 2207/10028; G06T 17/20; G06T 7/33; G06T 19/20; G06T 2207/10032; G06T 2207/20221; G06T 2210/04; G06T 17/00; G06T 19/00; G06T 15/04
See application file for complete search history.

(56) References Cited

U.S. PATENT DOCUMENTS

| 2021/0158009 A1* | 5/2021 | Zhou | G06V 20/10 |
| 2021/0174580 A1* | 6/2021 | Mundy | G06T 15/06 |

FOREIGN PATENT DOCUMENTS

| CN | 101739721 A | 6/2010 |
| CN | 105184789 A | 12/2015 |
| CN | 106327576 A | 1/2017 |
| CN | 108133516 A | 6/2018 |
| CN | 112435223 A | 3/2021 |

OTHER PUBLICATIONS

Chinese Office Action dated Jun. 30, 2021 issued in corresponding Patent Application No. 202110474636.X (7 pages).

* cited by examiner

*Primary Examiner* — Hau H Nguyen
(74) *Attorney, Agent, or Firm* — Polsinelli PC

(57) ABSTRACT

A method, a device, a computer device and a storage medium for a real-time urban scene reconstruction are provided. The method comprises: obtaining a target image frame and an adjacent image frame corresponding to a target urban scene; locating a position of an object in the target image frame according to the target image frame and the adjacent image frame and obtaining an object point cloud, an object image and a coordinate transformation matrix corresponding to a target object; determining a global characteristic of the target object and parameters of surfaces to be selected of the target object which is configured to determine a characteristic of the surface to be selected; determining a plane combination matrix of the target object; reconstructing a three-dimensional scene model of the target urban scene according to the plane combination matrix, the parameters of the surfaces to be selected and the coordinate transformation matrix.

18 Claims, 6 Drawing Sheets

METHOD, COMPUTER DEVICE AND STORAGE MEDIUM FOR REAL-TIME URBAN SCENE RECONSTRUCTION

CROSS-REFERENCE TO RELATED APPLICATIONS

This application claims all benefits accruing under 35 U.S.C. § 119 from China Patent Application No. 202110474636.X, filed on Apr. 29, 2021, in the China National Intellectual Property Administration, the content of which is hereby incorporated by reference.

TECHNICAL FIELD

The present disclosure generally relates to a technical field of computer vision, and in particular, to a method, a computer device and a storage medium for a real-time urban scene reconstruction.

BACKGROUND

With a development of computer vision technology, reconstruction technology for three-dimensional scene develops which reconstructs three-dimensional model based on two-dimensional image. The three-dimensional scene reconstruction technology is widely used in three-dimensional object recognition, geographical and geological survey, automatic driving, urban planning, navigation, obstacle avoidance or exploration etc. Therefore, how to reconstruct the three-dimensional model based on the two-dimensional image is a problem worth of attention.

At present, a three-dimensional point cloud is usually reconstructed based on the two-dimensional image, and then the reconstructed three-dimensional point cloud is post-processed complexly to reconstruct the three-dimensional model, which has a problem of low efficiency of reconstruction. Even if the three-dimensional model is reconstructed based on the two-dimensional image directly, only the three-dimensional model composed of a sparse point cloud can be reconstructed, resulting in a low accuracy of reconstruction. Therefore, a current method for three-dimensional scene reconstruction has a problem that the accuracy and the efficiency of reconstruction cannot be taken into account both, and it is difficult to be applied to a reconstruction of an urban scene.

SUMMARY

Thus, it is desired to provide a method, a computer device and a storage medium for a real-time urban scene reconstruction to take the accuracy and the efficiency of reconstruction into account both.

One aspect of the disclosure provides a method for an urban scene reconstruction which includes: obtaining a target image frame corresponding to a target urban scene, and an adjacent image frame of the target image frame; locating a position of an object in the target image frame according to the target image frame and the adjacent image frame and obtaining an object point cloud, an object image and a coordinate transformation matrix corresponding to a target object; determining a global characteristic of the target object and parameters of surfaces to be selected of the target object according to the object point cloud and the object image; determining a characteristic of the surface to be selected according to the parameters of the surfaces to be selected and the global characteristic of the target object; determining a plane combination matrix of the target object according to the characteristic of the surface to be selected; and reconstructing a three-dimensional scene model of the target urban scene according to the plane combination matrix, the parameters of the surfaces to be selected and the coordinate transformation matrix.

In an embodiment of the present disclosure, the locating a position of an object in the target image frame according to the target image frame and the adjacent image frame and the obtaining an object point cloud, an object image and a coordinate transformation matrix corresponding to a target object includes: determining a scene point cloud corresponding to the target image frame according to the target image frame and the adjacent image frame; obtaining a corresponding image mask by instance segmentation of the target image frame; determining the object point cloud and the coordinate transformation matrix corresponding to the target object in the target image frame according to the scene point cloud and the image mask; and determining the object image corresponding to the target object according to the target image frame and the image mask.

In an embodiment of the present disclosure, the determining the object point cloud and the coordinate transformation matrix corresponding to the target object in the target image frame according to the scene point cloud and the image mask includes: segmenting the scene point cloud according to the image mask to obtain an initial point cloud corresponding to the target object in the target image frame; and transferring the initial point cloud to a reconstructed coordinate system to obtain the object point cloud and the coordinate transformation matrix corresponding to the target object.

In an embodiment of the present disclosure, the determining a global characteristic of the target object and parameters of surfaces to be selected of the target object according to the object point cloud and the object image includes: determining a point cloud characteristic of the target object according to the object point cloud; determining an image characteristic of the target object according to the object image; and mixing these two characteristic to determine the global characteristic of the target object and the parameters of the surfaces to be selected of the target object according to the point cloud characteristic and the image characteristic.

In an embodiment of the present disclosure, the determining a characteristic of the surface to be selected according to the parameters of the surfaces to be selected and the global characteristic of the target object includes: determining a weight of each surface to be selected of the target object in each unit of global information according to the parameters of the surfaces to be selected; and determining a characteristic of a corresponding surface to be selected according to the weight and the global characteristic.

In an embodiment of the present disclosure, the reconstructing a three-dimensional scene model of the target urban scene according to the plane combination matrix, the parameters of the surfaces to be selected and the coordinate transformation matrix includes: reconstructing a three-dimensional object model corresponding to the target object according to the plane combination matrix and the parameters of the surfaces to be selected and the coordinate transformation matrix; and reconstructing the three-dimensional scene model of the target urban scene according to the three-dimensional object model and the coordinate transformation matrix.

In an embodiment of the present disclosure, the reconstructing a three-dimensional object model corresponding to the target object according to the plane combination matrix and the parameters of the surfaces to be selected and the coordinate transformation matrix includes: multiplying the plane combination matrix by the parameters of the surfaces to be selected to obtain a convex package group; and reconstructing the three-dimensional object model corresponding to the target object according to the convex package group.

Another aspect of the disclosure provides a computer device includes a memory and a processor, wherein the memory stores a computer program, and the processor is configured to execute the computer program to implement a method for an urban scene reconstruction including: obtaining a target image frame corresponding to a target urban scene, and an adjacent image frame of the target image frame; locating a position of an object in the target image frame according to the target image frame and the adjacent image frame and obtaining an object point cloud, an object image and a coordinate transformation matrix corresponding to a target object; determining a global characteristic of the target object and parameters of surfaces to be selected of the target object according to the object point cloud and the object image; determining a characteristic of the surface to be selected according to the parameters of the surfaces to be selected and the global characteristic of the target object; determining a plane combination matrix of the target object according to the characteristic of the surface to be selected; and reconstructing a three-dimensional scene model of the target urban scene according to the plane combination matrix, the parameters of the surfaces to be selected and the coordinate transformation matrix.

Yet another aspect of the present disclosure provides a readable storage medium having a computer program stored thereon. The computer program is executed by a processor to implement a method for an urban scene reconstruction including: obtaining a target image frame corresponding to a target urban scene, and an adjacent image frame of the target image frame; locating a position of an object in the target image frame according to the target image frame and the adjacent image frame and obtaining an object point cloud, an object image and a coordinate transformation matrix corresponding to a target object; determining a global characteristic of the target object and parameters of surfaces to be selected of the target object according to the object point cloud and the object image; determining a characteristic of the surface to be selected according to the parameters of the surfaces to be selected and the global characteristic of the target object; determining a plane combination matrix of the target object according to the characteristic of the surface to be selected; and reconstructing a three-dimensional scene model of the target urban scene according to the plane combination matrix, the parameters of the surfaces to be selected and the coordinate transformation matrix.

DETAILED DESCRIPTION

The present disclosure will be further described in detail below with reference to the drawings and specific embodiments, in order to better understand the objective, the technical solution and the advantage of the present disclosure. It should be understood that the specific embodiments described herein are merely illustrative and are not intended to limit the scope of the present disclosure.

Figure 1:
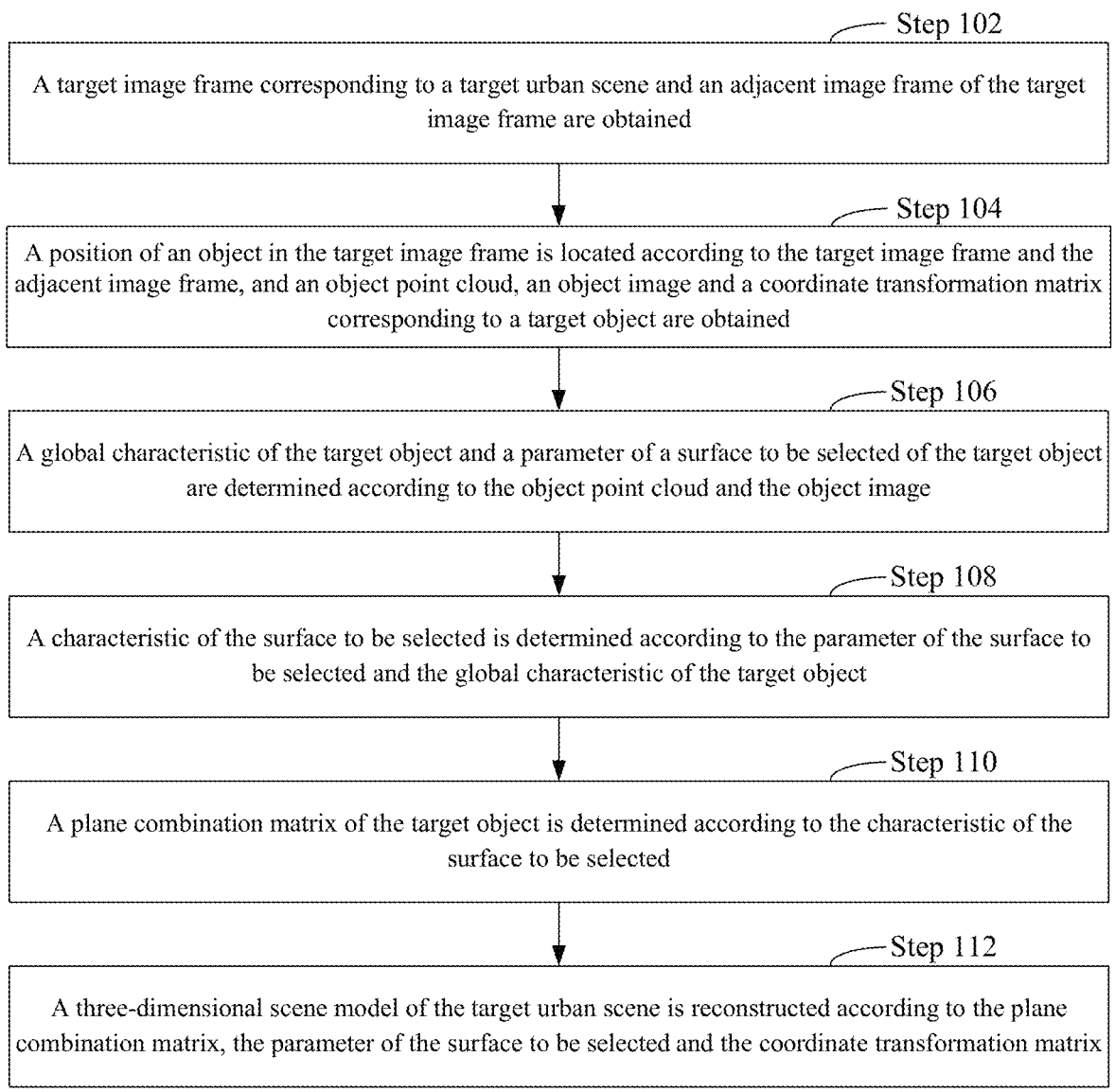
FIG. 1 is a flowchart diagram of a method for an urban scene reconstruction in an embodiment.

In an embodiment, as shown in FIG. 1, a method for an urban scene reconstruction is provided. This embodiment is illustrated by applying the method to a terminal. It is understood that the method can also be applied to a server, or a system including a terminal and a server, and the method can be implemented by an interaction between the terminal and the server. In this embodiment, the method includes the following steps:

At step 102, a target image frame corresponding to a target urban scene and an adjacent image frame of the target image frame are obtained.

The target urban scene can be an urban scene, a three-dimensional model of which is to be reconstructed. The target image frame can be an image of a three-dimensional scene model configured to reconstruct the target urban scene. In detail, the target image frame can be a current frame in a target video. The adjacent image frame can be an image, acquisition time of which is adjacent to that of the target image frame, and corresponding to the target urban scene. There is a same target object in both the target image frame and the adjacent image frame. Specifically, the adjacent image frame can be a video frame that is adjacent to the target image frame in the target video, such as a previous frame and/or a subsequent frame.

Specifically, the terminal can obtain the target image frame corresponding to the target urban scene and the adjacent image frame of the target image frame by a camera. It can be understood that the camera can be integrated inside the terminal as a component of the terminal, or the camera can be disposed as an independent device, and communicate with the terminal by a network.

In an embodiment, the terminal can collect the target video corresponding to the target urban scene by the camera, extract the current frame from the target video as the target image frame, and extract an adjacent frame of the current frame from the target video as the adjacent image frame of the target image frame. The terminal can select the current frame and the adjacent frame of the current frame from the target video according to requirements of scene reconstruction. For example, for the scene reconstruction with high real-time requirements, the video frame with the latest collection time in the target video can be taken as the current frame, and the previous frame of the current frame can be taken as the adjacent image frame, resulting in facilitating a real-time reconstruction of the urban scene according to the method for the urban scene reconstruction provided in the present disclosure. For example, for the scene reconstruction with low real-time requirements, any video frame in the target video can be taken as the current frame, and the previous frame and/or the subsequent frame of the current frame can be taken as the adjacent image frame. A quantity of the adjacent image frame can be at least 3. It can be understood that the more the quantity of the adjacent image frames is, the more accurate a three-dimensional urban model reconstructed will be. However, an amount of data processing will also be increased, so the quantity of the adjacent image frame will be determined according to actual requirements, and there will be no specific limitation here.

In an actual application scenario, after a starting point and a destination of a flight of an unmanned aerial vehicle are set, the unmanned aerial vehicle can collect the target video in real time by the camera carried in the process of flying according to the disposed beginning and end. The unmanned aerial vehicle can extract the video frame with the latest collection time from the target video as the target image frame, and a previous frame of the target image frame as the adjacent image frame in real time by the terminal Based on the extracted target image frame and the extracted adjacent image frame, the unmanned aerial vehicle can reconstruct the three-dimensional scene model in real time according to the method for the urban scene reconstruction provided in the present disclosure, so as to complete a task of exploring and avoiding obstacles during the flight as well as a task of a visible part urban reconstruction according to the three-dimensional scene model reconstructed.

At step 104, a position of an object in the target image frame is located according to the target image frame and the adjacent image frame, and an object point cloud, an object image and a coordinate transformation matrix corresponding to a target object are obtained.

The object point cloud can be a sparse point cloud corresponding to the target object of the target image in a reconstructed coordinate system. The object image refers to an image region of the target object in the target image frame. The coordinate transformation matrix refers to a transformation matrix that transforms a sparse point cloud of the target object in the world coordinate system to a sparse point cloud in the reconstructed coordinate system, which can also be understood as a coordinate system transformation matrix. The target object refers to a target item to be segmented in the target image frame, i.e., the target item to be reconstructed in the target urban scene, such as a building or a vehicle.

Specifically, the terminal can locate the position of the target object in the target image frame according to the target image frame and the adjacent image frame corresponding, to segment each target object from the target image frame and obtain the object point cloud, the object image and the coordinate transformation matrix corresponding to each target object.

At step 106, a global characteristic of the target object and parameters of surfaces to be selected of the target object are determined according to the object point cloud and the object image.

The parameters of the surfaces to be selected includes plane parameters of each surface to be selected corresponding to the target object. The plane parameters of each surface to be selected include four parameters, such as (nx, ny, nz, d). The global characteristic is configured to represent overall information of the target object, specifically covering a picture characteristic and a point characteristic. The global information can also be understood as a characteristic space.

Specifically, in the reconstructed coordinate system, for each target object in the target image frame, the terminal can extract the global characteristic of the target object according to the object point cloud and the object image corresponding to the target object, generate the surface to be selected corresponding to the target object, and determine the parameters of the surfaces to be selected corresponding.

At step 108, a characteristic of the surface to be selected is determined according to the parameters of the surfaces to be selected and the global characteristic of the target object.

The characteristic of the surface to be selected refers to a plane characteristic of the surface to be selected. In particular, the characteristic of the surface to be selected refers to a high-dimensional characteristic of the surface to be selected. Specifically, for each target object in the target image frame, after determining the global characteristic of the target object and the parameters of the surfaces to be selected of the target object, the terminal can determine the characteristic of the surface to be selected of the target object according to the global characteristic and the parameters of the surfaces to be selected, i.e., the terminal can determine the plane characteristic of each surface to be selected according to the global characteristic of the target object and the parameter of the surface to be selected of the target object.

At step 110, a plane combination matrix of the target object is determined according to the characteristic of the surface to be selected.

The plane combination matrix is configured to represent a possibility that each surface to be selected of the target object belongs to each convex package. Based on the plane combination matrix, the surface to be selected of each convex package can be determined from each surface to be selected of the target object. A dimension of the plane composition matrix is determined by the quantity of the surface to be selected and the convex package of the target object. Specifically, the terminal can determine the plane combination matrix of each target object according to the characteristic of the surface to be selected of each target object by a full connection layer.

In an embodiment, the terminal specifically determine the plane combination matrix of each target object by the following formula:

$$A = F^A(F_p)$$

Wherein $F_p$ represents the characteristic of the surface to be selected of the target object, $F^A$ represents a set of MLP (Muti-Layer Perception) layers, A represents the plane combination matrix of each target object, the dimension of the plane composition matrix can be p×c, c represents a quantity of the convex package, p represents the quantity of the surface to be selected of the target object, and the value $A_{i,j}$ in the matrix A represents the a possibility that the j-th surface to be selected belongs to the i-th convex package.

At step 112, a three-dimensional scene model of the target urban scene is reconstructed according to the plane combination matrix, the parameters of the surfaces to be selected and the coordinate transformation matrix.

Specifically, after obtaining the plane composition matrix, the parameters of the surfaces to be selected and the coordinate transformation matrix corresponding to each target object in the target image frame, a three-dimensional object model corresponding to the target object is reconstructed according to the plane composition matrix and the parameters of the surfaces to be selected corresponding to each target object. And the three-dimensional scene model of the target urban scene is reconstructed according to the three-dimensional object model and the coordinate transformation matrix corresponding to each target object in the target image frame.

According to the method for an urban scene reconstruction, the object point cloud, the object image and the coordinate transformation matrix corresponding to each target object in the target image frame can be obtained according to the target image frame and the target image frame of the target image frame corresponding to the target urban scene to be reconstructed. The global characteristic of the target object and the parameters of the surfaces to be selected of the target object are easy to extract according to the object point cloud and the object image corresponding to each target object. The characteristic of each surface to be selected of the target object is extracted according to the global characteristic and the parameters of each surface to be selected. The plane combination matrix corresponding to the target object is determined dynamically according to the characteristic of each surface to be selected, so as to reconstruct a three-dimensional scene model corresponding to the target urban scene according to the plane combination matrix, the parameters of the surfaces to be selected and the coordinate transformation matrix corresponding to each target object. In this way, a corresponding three-dimensional scene model can be reconstructed directly based on the target image frame of the target urban scene. Each target object of the target image frame in the three-dimensional scene model has a correct position and a correct size in a world coordinate system, and the three-dimensional scene model is tight and watertight. Therefore, the accuracy and the efficiency of urban scene reconstruction can be taken into account both, resulting in reconstructing accurate three-dimensional scene model in real time.

In an embodiment, step 104 includes: a scene point cloud corresponding to the target image frame is determined according to the target image frame and the adjacent image frame; a corresponding image mask is obtained by instance segmentation of the target image frame; the object point cloud and the coordinate transformation matrix corresponding to the target object in the target image frame are determined according to the scene point cloud and the image mask; and the object image corresponding to the target object is determined according to the target image frame and the image mask.

Specifically, the terminal can determine the scene point cloud of the target urban scene corresponding to the target image frame, according to the target image frame and the adjacent image frame corresponding. The terminal can perform instance segmentation on the target image frame to segment each target object from the target image frame and obtain the corresponding image mask. The terminal can segment the scene point cloud by a unit of an object according to the image mask, to obtain the sparse point cloud of each target object in the target image frame. And the terminal can obtain the object point cloud and the coordinate transformation matrix corresponding based on the sparse point cloud of each target object. The terminal can segment the target image frame by a unit of an object according to the image mask, to obtain the object image of each target object in the target image frame.

In an embodiment, the terminal can perform instance segmentation on the target image frame to obtain an initial image mask of each target object, in which a corresponding image region of each target object in a corresponding target image frame is marked. Furthermore, based on a preset threshold, the terminal can remove the target object having an area less than the preset threshold from the initial image mask, i.e., the target object corresponding to an image region having an area less than the preset threshold in the initial image mask is determined as an image background. The image region having an area less than the preset threshold in the initial image mask is marked as an image region corresponding to the image background, and a final image mask configured to segment the scene point cloud and the target image frame is obtained. It is understood that, image regions corresponding to different target objects can be marked by different colors in the initial image mask. In this way, based on the preset threshold, the target object having an area less than the preset threshold can be removed from the initial image mask, from initial image mask to remove an area of less than the preset threshold value of the target object, i.e., in the initial image mask, a color of the image region corresponding to the target object having an area less than the preset threshold is modified to be consistent with the color of the image region corresponding to the image background. The preset threshold can be customized, such as one percent of an image area of the target image frame. In this way, small and near-background target objects can be removed based on the preset threshold.

In an embodiment, the terminal can obtain the sparse point cloud of the target urban scene as the scene point cloud corresponding to the target image frame according to the target image frame and the adjacent image frame by SLAM (Simultaneous Localization and Mapping). The terminal can perform instance segmentation on the target image frame to obtain the corresponding image mask.

In the above embodiments, each target object in the target image frame is located in a two-dimensional image and a three-dimensional point cloud, respectively, to obtain the object point cloud and the object image of the target object, and the coordinate transformation matrix configured to represent a position and a size of the target object in the real world. In this way, based on the object point cloud, the object image and the coordinate transformation matrix of each target object, the three-dimensional scene model of the target urban scene can be reconstructed quickly and accurately.

In an embodiment, the determining the object point cloud and the coordinate transformation matrix corresponding to the target object in the target image frame according to the scene point cloud and the image mask includes: Segmenting the scene point cloud according to the image mask to obtain an initial point cloud corresponding to the target object in the target image frame; and transferring the initial point cloud to a reconstructed coordinate system to obtain the object point cloud and the coordinate transformation matrix corresponding to the target object.

Specifically, the terminal can segment the scene point cloud by the unit of the object according to the image mask corresponding to the target image frame, to obtain the sparse point cloud of each target object in the target image frame, which serves as the initial point cloud corresponding to the target object in the world coordinate system. Furthermore, the terminal can transform the initial point cloud of each target object from the world coordinate system to the reconstructed coordinate system, to obtain the object point cloud and the coordinate transformation matrix corresponding to the target object in the reconstructed coordinate system.

In an embodiment, the terminal can transfer the initial point cloud of each target object to an coordinate origin of the world coordinate system, resulting in that the initial point cloud in the direction of x axis (horizontal axis) and y axis (longitudinal axis) can form a center symmetric with the coordinate origin as a center, and the nearest point in the z-axis (vertical axis) direction from the coordinate origin is at a position where a value of z is greater than negative one and less than zero, so as to obtain a translation matrix. The terminal can scale a value of the initial point cloud in each axis to a range of [−1,1] to obtain a scaling matrix. Therefore, the coordinate transformation matrix can be obtained based on the translation matrix and the scaling matrix.

In the above embodiment, the initial point cloud of each target object can contain the target object information such as position, posture and movement. As a result, the posture and the size of the target object in the world coordinate system can be recorded through the coordinate transformation matrix determined by the initial point cloud, so as to reconstruct the posture and the size of each target object in the world coordinate system based on the coordinate transformation matrix and the three-dimensional object module of each target object in the subsequent scene reconstruction process.

In an embodiment, step 106 includes: a point cloud characteristic of the target object is determined according to the object point cloud; an image characteristic of the target object is determined according to the object image; and the global characteristic of the target object and the parameters of the surfaces to be selected of the target object are determined according to the point cloud characteristic and the image characteristic.

In an embodiment, the terminal can extract the image characteristic of the target object from the object image by CNN (Convolutional Neural Network), and extract the point cloud characteristic of the target object from the object point cloud by PointNet (a network for processing three-dimensional point cloud). A specific principle can be shown in the following formula:

$$R_v^{k\times 1}=E^v(I_t), R_g^{k\times 1}=E^g(C_b)$$

Wherein $C_b$ represents the object point cloud of the target object, which can specifically be sparse three-dimensional surface points corresponding to the target object, $I_t$ represents the object image of the target object, $E^v$ represents a set of convolutional layers, which can specifically be convolutional layers in CNN, $E^g$ represents a PointNet encoder, $R_v$ represents the image characteristic, i.e., a visual representation of the target image in the global information, and $R_g$ represents the point cloud characteristic, i.e., a geometric representation of the target object in the global information. For each target object, $R_v$ and $R_g$ are fixed values, and both are K×1 dimensional vectors.

In an embodiment, the terminal can generate the parameters of the surfaces to be selected corresponding to the target object according to the point cloud characteristic and the image characteristic of each target object by the multi-layer perception, and extract the global characteristic corresponding to the target object according to the point cloud characteristic and the image characteristic of each target object by a deconvolution layer. The specific principle can be shown in the following formula:

$$H=D(R_v,R_g), F^{D_s\times D_f}=E^f(R_v,R_g)$$

Wherein D represents a set of multi-layer perception (MLP) layers, H represents the parameters of the surfaces to be selected of the target object, specifically, p surfaces to be selected can be generated for the target object, and each surface to be selected has 4 parameters ($n_x$, $n_y$, $n_z$, d). $E^f$ represents a set of deconvolution layers, $D_s$ represents a space size of the global information (i.e., spatial dimension or resolution), such as 7×7×7, $D_f$ represents a characteristic size of the global information (i.e., characteristic dimension), such as 512, F represents the global characteristic of the target object, i.e., a spatial characteristic representation of the target object in the global information, and a dimension of F can be $D_s\times D_f$.

In the above embodiment, the global information and the parameters of the surfaces to be selected are extracted based on the point cloud characteristic and the image characteristic of each target object, so as to facilitate a rapid and accurate reconstruction of the three-dimensional object model of the target object based on the global information and the parameters of the surfaces to be selected.

In an embodiment, step 108 includes: a weight of the surface to be selected in each position of a characteristic space is determined according to the parameters of the surfaces to be selected, and the characteristic of the surface to be selected is determined according to the weight and the global characteristic.

The weight of the surface to be selected in each unit of global information can be understood as a spatial weight of the surface to be selected.

Specifically, the terminal can convert the parameters of the surfaces to be selected into the weights in different units of the global information by an attention matrix from a region to a plane. In this way, the terminal can associate the parameters of the surfaces to be selected with the attention matrix from a region to a plane to obtain a spatial weight matrix. The spatial weight matrix represents the weight of each surface to be selected of the target object in different units of the global information, i.e., the weight of each surface to be selected in different positions of the global information. It can be understood that the attention matrix from a region to a plane is learnable. This attention matrix can associate the weight in different units of the global information with the plane parameters of each surface to be selected, i.e., this attention matrix can convert the plane parameters of each surface to be selected into the position information in the global information. Furthermore, the terminal can determine the characteristic of the surface to be selected corresponding to the target object according to the weight of each surface to be selected of the target object in each unit of the global information and the global characteristic of the target object. In this way, the terminal can determine the plane characteristic of each surface to be selected according to the spatial weight matrix and the global characteristic corresponding to the target object.

In an embodiment, according to the parameters of the surfaces to be selected of the target object and the global characteristic, the terminal can determine the characteristic of the corresponding surface to be selected by an attention mechanism from a region to a plane. The specific principle is shown in the following formula:

$$W=H\times E_p$$

Wherein $E_p$ represents the learnable attention matrix from a region to a plane; W represents the spatial weight matrix, which can specifically represent the weight of each surface to be selected of the target object in different positions of the global information. The value in W depends on the plane parameters of the surfaces to be selected, rather than a content of the global information. This ensures that the process of learning a region to a plane of the attention matrix is decoupled from the characteristic extracted from an input image or voxel.

After the spatial weight matrix corresponding to the target object is determined, the high-dimensional characteristic of each surface to be selected can be extracted from the global characteristic of the global information based on the following formula:

$$F_p = W \times F^{D_s \times D_f}$$

Wherein $F_p$ represents the characteristic of the surface to be selected corresponding to the target object, specifically including the plane characteristic of each surface to be selected corresponding to the target object.

In the above embodiment, the weight for extracting characteristic can be adjusted dynamically based on the region of interest in the whole scene, and the high-dimensional characteristic of each surface to be selected can be extracted from the global characteristic of the target object based on the adjusted weight for extracting characteristic, resulting in that the plane characteristic of each surface to be selected can be extracted better.

In an embodiment, step 112 includes: a three-dimensional object model corresponding to the target object is reconstructed according to the plane combination matrix and the parameters of the surfaces to be selected and the coordinate transformation matrix; and the three-dimensional scene model of the target urban scene is reconstructed according to the three-dimensional object model and the coordinate transformation matrix.

Specifically, the terminal can reconstruct the three-dimensional object model of the target object in the reconstructed coordinate system according to the plane combination matrix and the parameters of the surfaces to be selected corresponding to each target object, and transform the three-dimensional object model from the reconstructed coordinate system to the world coordinate system based on the coordinate transformation matrix. Wherein the terminal can multiply the three-dimensional object model corresponding to each target object with an inverse matrix of the coordinate transformation matrix, to determine the posture and the size of the three-dimensional object model in the world coordinate system. As a result, the three-dimensional scene model corresponding to the target urban scene can be reconstructed according to the posture and the size in the world coordinate system of the three-dimensional object model corresponding to each target object in the target image.

In the above embodiment, the three-dimensional object model can be reconstructed accurately based on the plane combination matrix and the parameters of the surfaces to be selected corresponding to each target object, and each three-dimensional object model reconstructed accurately can be restored to the world coordinate system based on the coordinate transformation matrix, so as to reconstruct the three-dimensional scene model of the target urban scene accurately in the real world coordinate system.

In an embodiment, the reconstructing a three-dimensional object model corresponding to the target object according to the plane combination matrix and the parameters of the surfaces to be selected and the coordinate transformation matrix includes: multiplying the plane combination matrix by the parameters of the surfaces to be selected to obtain a convex package group; and reconstructing the three-dimensional object model corresponding to the target object according to the convex package group.

Specifically, the terminal can multiply the plane combination matrix corresponding to each target object with the parameters of the surfaces to be selected to obtain a set of convex package corresponding to the target object, i.e., the convex package group corresponding to the target object. The terminal can determine the required surface to be selected for the composition of each convex package and the plane parameters of each surface to be selected according to the convex package group corresponding to each target object, and generate corresponding convex package according to the plane parameters of each surface to be selected which compose the same convex package. Furthermore, the terminal can generate the corresponding polygon mesh model corresponding to the target object based on each convex package corresponding to the target object, as the three-dimensional object model corresponding to the target object.

In the above embodiment, the convex package group is determined based on the plane combination matrix and the parameters of the surfaces to be selected, and the polygon mesh model is generated by associated planes which interact with each other, to reconstruct the three-dimensional object model of the target object.

In an embodiment, the terminal can use Marching Cubes (isosurface extraction) to reconstruct the three-dimensional scene of the object corresponding to the target object according to the plane combination matrix and the parameters of the surfaces to be selected corresponding to each target object. Furthermore, the terminal can reconstruct the three-dimensional scene module corresponding to the target urban scene according to the three-dimensional object model of each target object and the coordinate transformation matrix. It can be understood that a likelihood value in the plane combination matrix is directly used in the calculation of signed distance when the terminal reconstructs the three-dimensional object scene by means of Marching Cubes.

Figure 2:
FIG. 2 is another flowchart diagram of a method for an urban scene reconstruction in an embodiment.

FIG. 2 is another flowchart diagram of a method for an urban scene reconstruction in an embodiment. As shown in FIG. 2, the method specifically includes the following steps:

At step 202, a target image frame corresponding to a target urban scene and an adjacent image frame of the target image frame are obtained.

At step 204, a scene point cloud corresponding to the target image frame is determined according to the target image frame and the adjacent image frame.

At step 206, a corresponding image mask is obtained by instance segmentation of the target image frame.

At step 208, the scene point cloud is segmented according to the image mask to obtain an initial point cloud corresponding to a target object in the target image frame.

At step 210, the initial point cloud is transformed to a reconstructed coordinate system to obtain an object point cloud and a coordinate transformation matrix corresponding to the target object.

At step 212, an object image corresponding to the target object is determined according to the target image frame and the image mask.

At step 214, a point cloud characteristic of the target object is determined according to the object point cloud.

At step 216, an image characteristic of the target object is determined according to the object image.

At step 218, a global characteristic of the target object and parameters of surfaces to be selected of the target object are determined according to the point cloud characteristic and the image characteristic.

At step 220, a weight of each surface to be selected of the target object in each unit of global information is determined according to the parameters of the surfaces to be selected.

At step 222, a characteristic of a corresponding surface to be selected is determined according to the weight and the global characteristic.

At step 224, a plane combination matrix of the target object is determined according to the characteristic of the surface to be selected.

At step 226, the plane combination matrix is multiplied by the parameters of the surfaces to be selected to obtain a convex package group.

At step 228, a three-dimensional object model corresponding to the target object is reconstructed according to the convex package group.

At step 230, a three-dimensional scene model of the target urban scene is reconstructed according to the three-dimensional object model and the coordinate transformation matrix.

In the above embodiment, based on the target image frame and the adjacent image frame corresponding to the target urban scene, the target object in the target urban scene is located to extract the target object information such as position, posture and movement, and the corresponding object point cloud, object image and coordinate transformation matrix are obtained. Furthermore, by an attention mechanism from a region to a plane, the surface to be selected is determined according to the object point cloud and the object image of the target object, and the plane characteristic of the surface to be selected is extracted. By an attention mechanism from a plane to a convex package, the plane combination matrix can be determined dynamically according to the plane characteristic of each surface to be selected, in order to further reconstruct the three-dimensional object model according to characteristic changes of the target object and obtain a more accurate three-dimensional object model. The posture and the size of the three-dimensional object model in the world coordinate system can be determined based on the coordinate transformation matrix, so as to accurately reconstruct the three-dimensional scene model.

Figure 3:
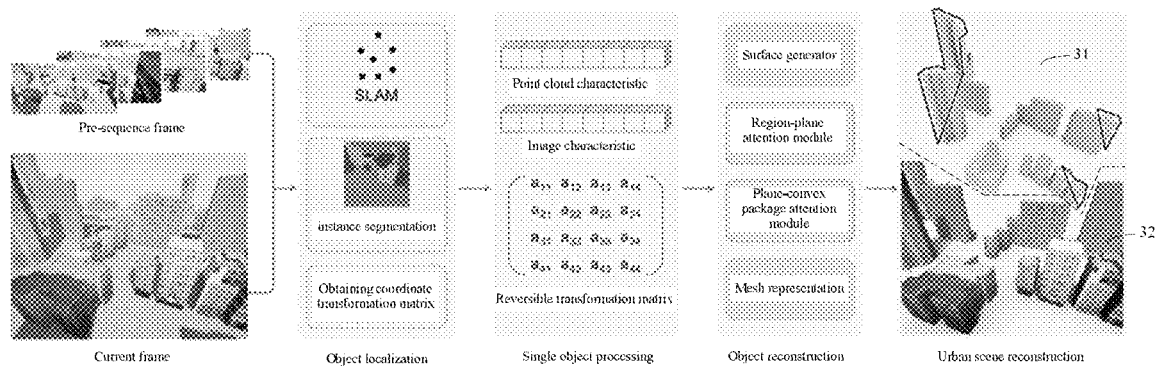
FIG. 3 is an overall frame diagram of a method for an urban scene reconstruction in an embodiment.

FIG. 3 is an overall frame diagram of a method for an urban scene reconstruction in an embodiment. As shown in FIG. 3, a core idea of the reconstruction method for an urban scene provided in the present disclosure is to restore each target object to its correct position while rebuilding each target object in a large-scale scene, so as to reconstruct an accurate three-dimensional scene model. The terminal can obtain the current frame as the target image frame, the previous frame of the current frame as the adjacent image frame, and the urban scene corresponding to the current frame as the target urban scene of the corresponding three-dimensional scene model to be reconstructed. The terminal can locate the object in the target urban scene according to the current frame and the previous frame. In an object localization stage, the terminal can separate a single target object from the target urban scene by the instance segmentation and SLAM, extract information such as position, posture and movement, and obtain the coordinate transformation matrix of the target object by transforming the extracted information, specifically including: the scene point cloud corresponding to the target urban scene is determined according to the current frame and the previous frame by SLAM, and the image mask is obtained by instance segmentation of the current frame to separate each target object from the current frame; the object image corresponding to each target object is segmented from the current frame according to the image mask, and the initial point cloud of each target object is segmented from the scene point cloud; and the initial point cloud of each target object is transformed from the world coordinate system to the reconstructed coordinate system to obtain the coordinate transformation matrix and the object point cloud corresponding. In this way, the posture information is added into a network training to ensure that the reconstructed three-dimensional model is tight and watertight, and the reconstructed three-dimensional model has the correct posture and size in the world coordinate system.

In an object reconstruction stage, the terminal can reconstruct the three-dimensional object model based on the object point cloud and object image corresponding to each target object in the target urban scene, specifically including: for each target object, the coordinate transformation matrix corresponding to the target object can be a reversible transformation matrix, which is configured to determine the posture, size and other information of the three-dimensional object model in the three-dimensional scene model; the terminal can obtain the point cloud characteristic of the target object according to the object point cloud and obtain the image characteristic of the target object according to the object image; furthermore, the surfaces to be selected are generated according to the point cloud characteristic and the image characteristic corresponding to the target object by a surface generator, and the parameters of the corresponding surfaces to be selected can be determined; the global characteristic is extracted according to the point cloud characteristic and the image characteristic by a deconvolution layer; a region-plane attention module can extract the characteristic of the surface to be selected of the target object according to the parameters of the surfaces to be selected and the global characteristic of the target object by a region-plane attention mechanism; a plane-convex package attention module can determine the plane combination matrix of the target object dynamically according to the characteristic of the surface to be selected by a plane-convex package attention mechanism, resulting in that a mesh representation of the target object can be obtained based on the plane combination matrix of the target object and the parameters of the surfaces to be selected, and the mesh representation can be the reconstructed three-dimensional object model.

It can be understood that the surface generator is a software module in an object reconstruction network to generate the surface to be selected according to the point cloud characteristic and the image characteristic. The surface generator can be a set of multi-layer perception layers. Both the region-plane attention module and the plane-convex package attention module are software modules in the object reconstruction network. The object reconstruction network can be an optimized and improved BSP-NET (a network that generates compact meshes by Binary Space Partitioning tree), and a basic principle of the object reconstruction network is differentiable BSP (Binary Space Partitioning Tree). The object reconstruction network provided in the present disclosure is joined two kinds of attention mechanism compared with the existing BSP-Net, one is the region-plane attention mechanism applied in the region-plane attention module, ensuring that extracting the plane characteristic of each surface to be selected better, another one is the plane-convex package attention mechanism applied in the plane-convex package attention module, to replace a fixed plane combination matrix and change the plane combination matrix dynamically according to the characteristic of the surface to be selected during the reconstruction of the three-dimensional object model. Therefore, by improving the two attention mechanism modules, the method for the urban scene reconstruction provided in the present disclosure can accurately reconstruct the urban scene in real time in the real environment.

Furthermore, after obtaining the three-dimensional object model and the coordinate transformation matrix corresponding to each target object in the target urban scene, the terminal can reconstruct the urban scene according to the three-dimensional object model and the coordinate transformation matrix, specifically including: the posture of the corresponding three-dimensional object model in the three-dimensional scene model is determined according to the coordinate transformation matrix to reconstruct the three-dimensional scene model of the target urban scene. Label 31 in FIG. 3 represents a scene mesh model reconstructed by the method for the urban scene reconstruction provided in the present disclosure, i.e., the three-dimensional scene model. Label 32 represents the urban scene to be textured after filling the scene mesh model, so as to facilitate a visualization of reconstruction results. FIG. 3 shows that the method for the urban scene reconstruction can reconstruct a complete three-dimensional scene model. Even if the target object to be reconstructed in the target urban scene is not displayed completely in the target image frame, a complete three-dimensional object model can be reconstructed, and then the three-dimensional scene model including the complete three-dimensional object model can be reconstructed.

Figure 4:
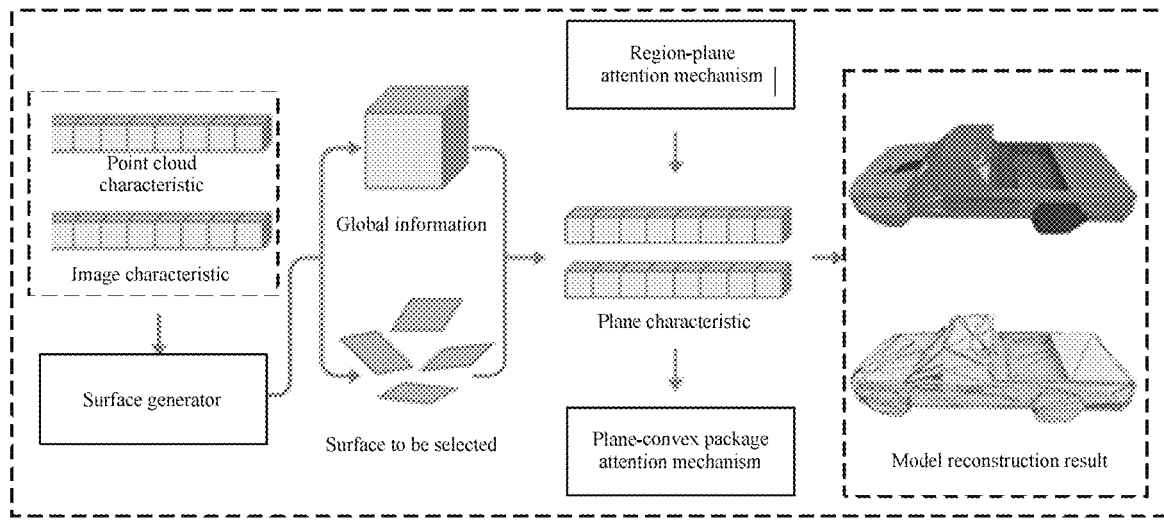
FIG. 4 is a schematic diagram of an object reconstruction network in an embodiment.

FIG. 4 is a schematic diagram of an object reconstruction network in an embodiment. As shown in FIG. 4, the object reconstruction network can obtain the point cloud characteristic and the image characteristic, respectively, according to the object point cloud and the object image, and extract the corresponding global information according to the point cloud characteristic and the image characteristic of each target object, i.e., the global characteristic in the global information. And a set of surfaces to be selected is generated by the surface generator according to the point cloud characteristic and the image characteristic of each target object, and the plane parameters of each surface to be selected are determined. Furthermore, the corresponding plane characteristic is extracted according to the global information and the plane parameters of each surface to be selected by the region-plane attention mechanism, and the plane combination matrix is determined according to the plane characteristic of each surface to be selected by the plane-convex package attention mechanism, so as to reconstruct the three-dimensional object model based on the plane combination matrix and each plane parameter. The reconstruction model shown in FIG. 4 includes a mesh model and a texture model. So it can be shown that the three-dimensional object model can be reconstructed better by using the two attention mechanisms to complete the extraction of the plane characteristic and the combination of the surface to be selected.

Figure 5A:
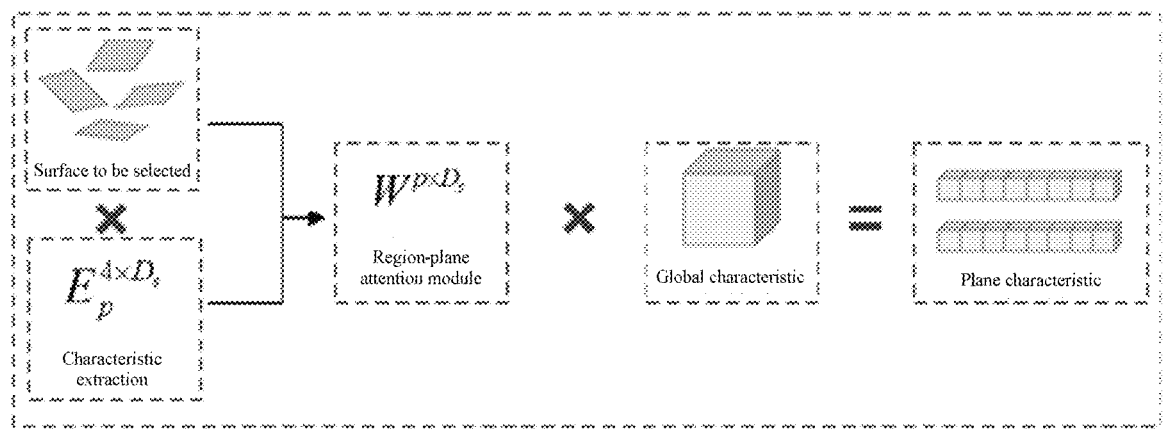
FIG. 5a is a schematic diagram of determining a plane characteristic based on plane parameters of surfaces to be selected in an embodiment.

FIG. 5a is a schematic diagram of determining a plane characteristic based on plane parameters of a surface to be selected in an embodiment. As shown in FIG. 5a, after generating the surface to be selected of the target object and determining the learnable attention matrix from a region to a plan, the spatial weight matrix can be determined according to the plane parameters of each surface to be selected and the attention matrix from a region to a plan by the region-plane attention module. The spatial weight matrix includes the weight of each surface to be selected in different units of the global information, and the plane characteristic of each surface to be selected is obtained according to the spatial weight matrix and the global characteristic of the target object. Wherein $E_p^{4 \times D_s}$ represents an attention matrix $E_p$ with a dimension of 4×Ds, priori information from a region to a plane is extracted when training the attention matrix; $w^{p \times D_s}$ represents the spatial weight matrix W with a dimension of p×Ds. FIG. 5a shows that the plane parameters of each surface to be selected can be converted to a set of weights of different units in the global information by training the attention matrix from a region to a plane, and then the spatial weight matrix can be multiplied with the global characteristic to obtain high dimensional characteristic of each surface to be selected, to convert a four-dimensional plane parameters of each surface to be selected to a high dimensional characteristic corresponding.

Figure 5B:
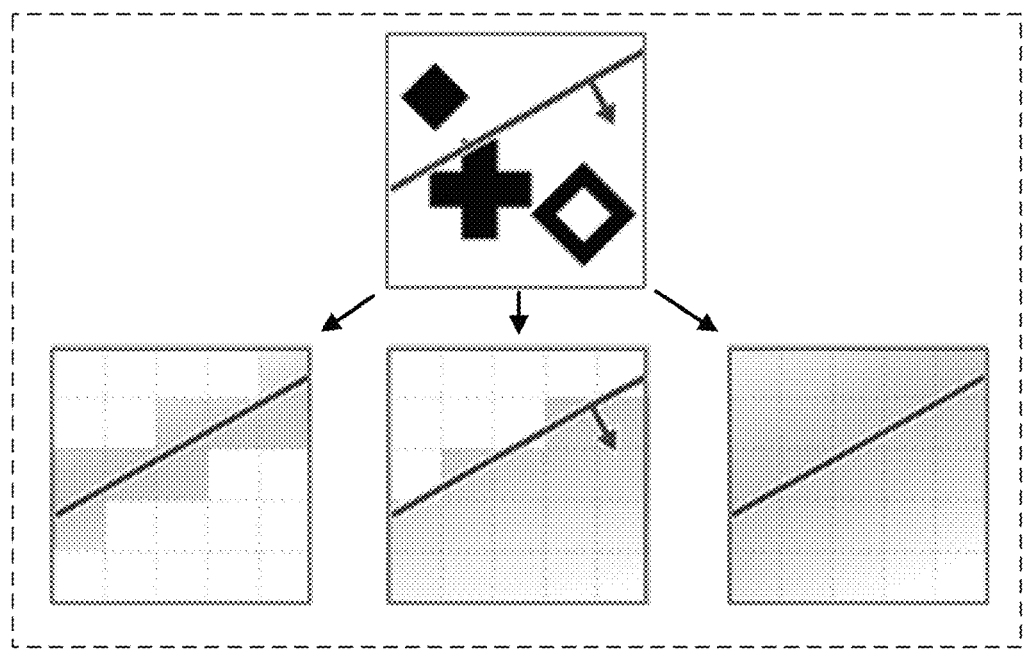
FIG. 5b is a schematic diagram of an effect of region of interest in direction planes defined by different ways in an embodiment.

FIG. 5b is a schematic diagram of an effect of region of interest in direction planes defined by different ways in an embodiment. As shown in FIG. 5b, a region of interest (ROI) of a direction plane can be defined in different ways. Wherein, the black slash represents the direction plane, and three ways to define the ROI are provided, respectively: a region near the direction plane is determined as the ROI; a region specified by the plane direction of the direction plane is determined as the ROI; the region within the entire scene is determined as the ROI. It can be understood that in the Mask R-CNN, the parameters of the proposed bounding box are configured to extract the high-dimensional characteristic of the box from the global characteristic of the whole scene. This method of characteristic extraction is custom, including selection (the characteristic of the pixel in the bounding box) and interpretation. In one or more embodiments of the present disclosure, the terminal can extract the high-dimensional characteristic as the plane characteristic of the surface to be selected based on the plane parameters ($n_x$, $n_y$, $n_z$, d) of the surface to be selected. However, unlike a bounding box that naturally represents a closed ROI, there is no intuitive way to define a ROI for the direction plane. Based on test results shown in FIG. 5b, it can be shown that the method of dynamically adjusting the weight for extracting characteristic by the ROI in the whole scene can achieve the best effect, and this method can be called the region-to-plane attention mechanism.

Figure 6A:
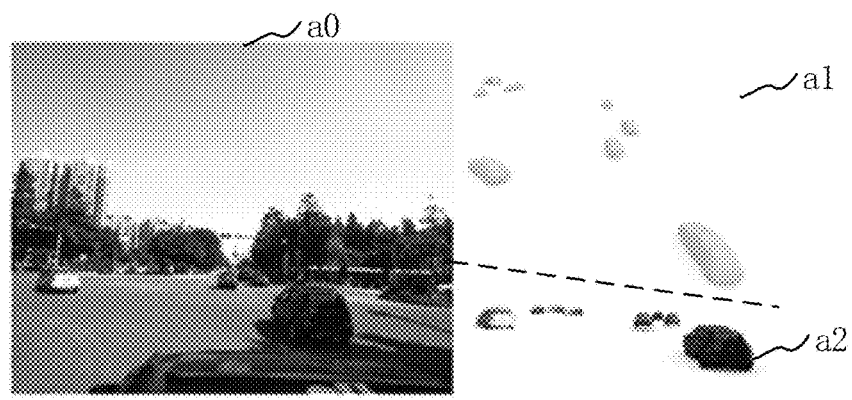
FIG. 6a is a schematic diagram of an effect of testing a method for an urban scene reconstruction on an ApolloCar3D data set in an embodiment.

FIG. 6a is a schematic diagram of an effect of testing a method for an urban scene reconstruction on an ApolloCar3D data set in an embodiment. In FIG. 6a, label a0 corresponds to the target image frame, label a1 corresponds to the mesh model reconstructed based on Marching Cube, and label a2 corresponds to the reconstructed vehicle with texture. Therefore, the model reconstructed based on the method for the urban scene reconstruction provided in the present disclosure is tight and watertight. It can be understood that in the embodiment, the target object to be reconstructed in the target urban scene is the vehicle in the target image frame. It is worth noting that during reconstruction in this scene, when the vehicle occupies only a small region in the image frame (less than 80×80 pixels by default), the vehicle will not be considered.

Figure 6B:
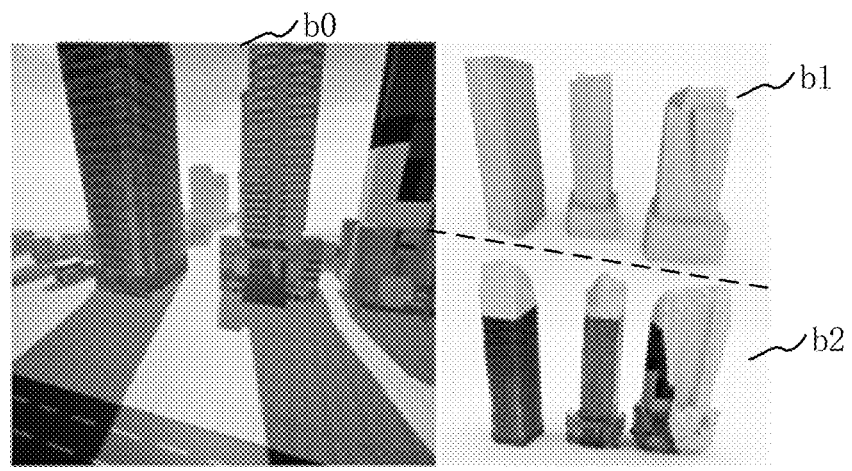
FIG. 6b is a schematic diagram of an effect of testing a method for an urban scene reconstruction on a VirtualCity3D data set in an embodiment.

FIG. 6b is a schematic diagram of an effect of testing a method for an urban scene reconstruction on a VirtualCity3D data set in an embodiment. In FIG. 6b, label b0 corresponds to a single-purpose target image frame, label b1 corresponds to a mesh model reconstructed by intersection of facets, label b2 corresponds to a mesh model reconstructed by Marching Cube. The figure shows that, the mesh in the mesh model reconstructed by the method for the urban scene reconstruction provided in the present disclosure is very tight and retains sharp edges. It can be understood that, in the embodiment, the target object to be reconstructed in the target urban scene is the building in the target image frame.

In an embodiment, for the object reconstruction network involved in one or more embodiments of the present disclosure, the object type of the target object that can be reconstructed is related to the training data used to train the object reconstruction network. For example, if the object type of the target object to be reconstructed is the vehicle, then the object type of the target object involved in the training data is also the vehicle; if the object type of the target object to be reconstructed is the building, then the object type of the target object involved in the training data is also the building.

Therefore, the method for the urban scene reconstruction provided in the present disclosure can reconstruct the three-dimensional scene model, and the accurate models for the target image frames collected under different scenes can be restored, thus verifying the accuracy and effectiveness of the method.

Figure 7A:
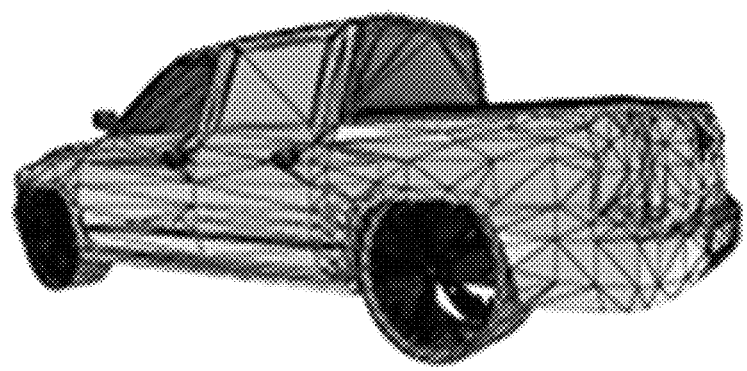
FIG. 7a is a schematic diagram of an effect of reconstructing a target object network based on a truth model in an embodiment.
Figure 7B:
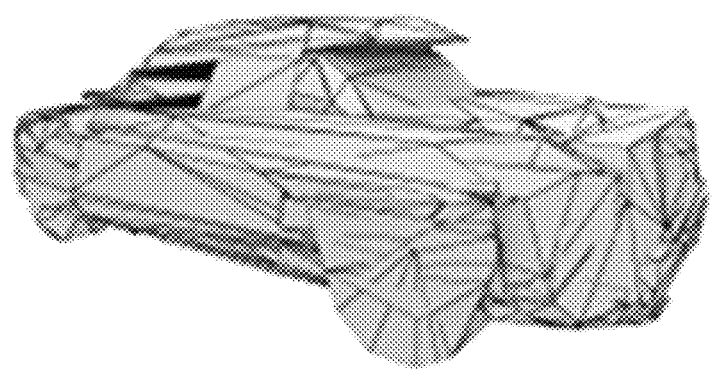
FIG. 7b is a schematic diagram of an effect of reconstructing a target object network based on a BSP-Net in an embodiment.
Figure 7C:
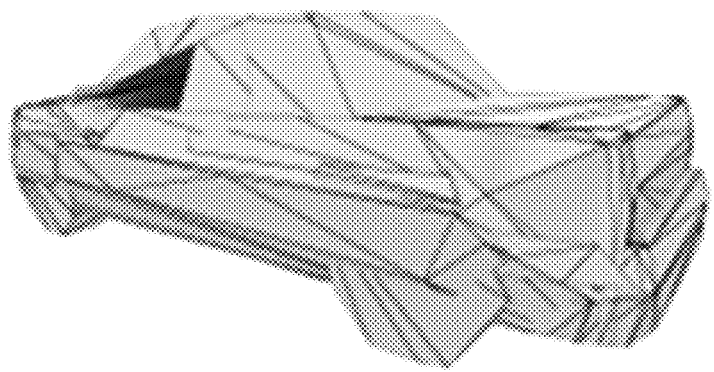
FIG. 7c is a schematic diagram of an effect of reconstructing a target object network based on a reconstruction method for an urban scene in an embodiment.

FIG. 7a is a schematic diagram of an effect of reconstructing a target object network based on a truth model in an embodiment. As shown in FIG. 7a, the mesh model reconstructed based on the truth model has 32070 vertices and 55324 triangles. FIG. 7b is a schematic diagram of an effect of reconstructing a target object network based on a BSP-Net (a network that generates compact meshes by Binary Space Partitioning tree) in an embodiment. As shown in FIG. 7b, the mesh model reconstructed based on the BSP-Net has 5868 vertices and 3588 triangles. FIG. 7c is a schematic diagram of an effect of reconstructing a target object network based on a method for an urban scene reconstruction in an embodiment. As shown in FIG. 7c, the mesh model reconstructed based on the method for the urban scene reconstruction provided in the present disclosure has 1872 vertices and 1160 triangles. Referring to FIG. 7a to FIG. 7c, based on the truth model, BSP-NET and the method for the urban scene reconstruction provided in the present disclosure, the corresponding mesh model can be obtained when the same target object (truck) is reconstructed, respectively. However, the mesh model reconstructed by the method for the urban scene reconstruction provided in the present disclosure has fewer vertices and triangles and is more similar to the real model. In details, referring to the roof and rear bumper region. Therefore, the method for the urban scene reconstruction provided in the present disclosure can reduce the complexity of the mesh model. It is worth noting that the number of triangles obtained after triangulation will change, even if different objects are reconstructed with a fixed number of planes. Thus the method for the urban scene reconstruction provided in the present disclosure can reconstruct a more concise and accurate mesh model.

In an embodiment, the method for the urban scene reconstruction provided in the present disclosure is applied to a system for the urban scene reconstruction, which can be carried on the vehicle to complete the task of assisting the driver to explore the surrounding vehicles.

It should be understood that while the steps in the flowchart diagrams in FIG. 1 and FIG. 2 are shown in the order indicated by the arrows, the steps are not necessarily executed in the order indicated by the arrows. Unless expressly stated in this article, there is no strict order in which these steps can be performed, and the steps can be performed in other orders. Moreover, at least some of the steps in FIG. 1 and FIG. 2 can include multiple steps or stages, which are not necessarily completed at the same time, but at different times, and the execution sequence of these steps or stages is not necessarily sequential. Instead, it may be performed alternately or alternately with other steps or at least a portion of steps or phases within other steps.

Figure 8:
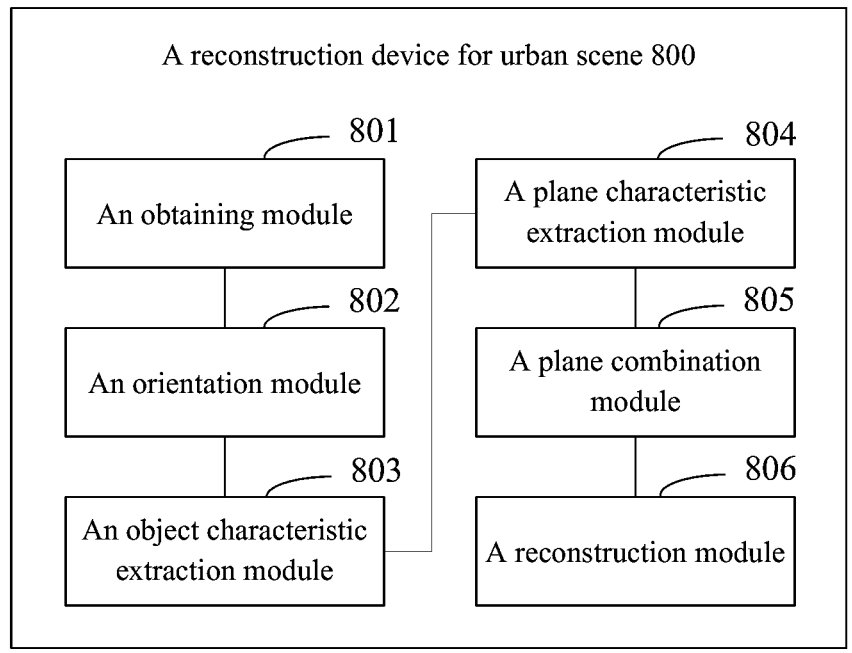
FIG. 8 is a block diagram of a structure of a device for an urban scene reconstruction in an embodiment.

In an embodiment, as shown in FIG. 8, a device for urban scene reconstruction 800 is provided, including: an obtaining module 801, an orientation module 802, an object characteristic extraction module 803, a plane characteristic extraction module 804, a plane combination module 805 and a reconstruction module 806.

The obtaining module 801 is configured to obtain a target image frame corresponding to a target urban scene, and an adjacent image frame of the target image frame.

The orientation module 802 is configured to locate a position of an object in the target image frame according to the target image frame and the adjacent image frame and obtain an object point cloud, an object image and a coordinate transformation matrix corresponding to a target object.

The object characteristic extraction module 803 is configured to determine a global characteristic of the target object and parameters of surfaces to be selected of the target object according to the object point cloud and the object image.

The plane characteristic extraction module 804 is configured to determine a characteristic of the surface to be selected according to the parameters of the surfaces to be selected and the global characteristic of the target object;

The plane combination module 805 is configured to determine a plane combination matrix of the target object according to the characteristic of the surface to be selected; and The reconstruction module 806 is configured to reconstruct a three-dimensional scene model of the target urban scene according to the plane combination matrix, the parameters of the surfaces to be selected and the coordinate transformation matrix.

In an embodiment, the orientation module 802 is further configured to determine a scene point cloud corresponding to the target image frame according to the target image frame and the adjacent image frame; obtain a corresponding image mask by instance segmentation of the target image frame; determine the object point cloud and the coordinate transformation matrix corresponding to the target object in the target image frame according to the scene point cloud and the image mask; and determine the object image corresponding to the target object according to the target image frame and the image mask.

In an embodiment, the orientation module 802 is further configured to segment the scene point cloud according to the image mask to obtain an initial point cloud corresponding to the target object in the target image frame; and transform the initial point cloud to a reconstructed coordinate system to obtain the object point cloud and the coordinate transformation matrix corresponding to the target object.

In an embodiment, the object characteristic extraction module 803 is further configured to determine a point cloud characteristic of the target object according to the object point cloud; determine an image characteristic of the target object according to the object image; and determine the global characteristic of the target object and the parameters of the surfaces to be selected of the target object according to the point cloud characteristic and the image characteristic.

In an embodiment, the plane characteristic extraction module 804 is further configured to determine a weight of each surface to be selected of the target object in each unit of global information according to the parameters of the surfaces to be selected; and determine a characteristic of a corresponding surface to be selected according to the weight and the global characteristic.

In an embodiment, the reconstruction module 806 is further configured to reconstruct a three-dimensional object model corresponding to the target object according to the plane combination matrix and the parameters of the surfaces to be selected and the coordinate transformation matrix; and reconstruct the three-dimensional scene model of the target urban scene according to the three-dimensional object model and the coordinate transformation matrix.

In an embodiment, the reconstruction module 806 is further configured to multiply the plane combination matrix by the parameters of the surfaces to be selected to obtain a convex package group; and reconstruct the three-dimensional object model corresponding to the target object according to the convex package group.

For the specific limitation of the device for the urban scene reconstruction, please refer to the limitation of the method for the urban scene reconstruction mentioned above, which will not be repeated here. Each module in the above device for urban scene reconstruction can be realized wholly or partly through software, hardware and their combination. Each of the above modules may be embedded or independent of the processor in hardware form in the computer device, or can be stored in software form in the memory of the computer device, in order to facilitate the processor call to perform the operation corresponding to the above modules.

In an embodiment, a computer device is provided. The computer device may be a terminal and the internal structure diagram of the terminal may be shown in FIG. 9. The computer device may include a processor, a memory, a communication interface, a display screen and an input device connected by a system bus. The processor of the computer device is configured to provide calculating and control capabilities. The memory of the computer device may include a non-volatile storage medium and an internal memory. The non-volatile storage medium may store an operating system and computer programs. The internal memory may provide the environment for the operation of the operating system and the computer programs in the non-volatile storage medium. The communication interface of the computer device is configured for wired or wireless communication with external terminals, and the wireless communication may be achieved by WIFI, carrier network, NFC (near field communication), or other technologies. The computer program is executed by a processor to implement a method for the urban scene reconstruction. The display screen of the computer device may be a liquid crystal display screen or an electronic ink display screen, and the input device of the computer device may be a touch layer covered on the display screen, a key, trackball or touchpad set on the computer device shell, or an external keyboard, touchpad or mouse, etc.

Figure 9:
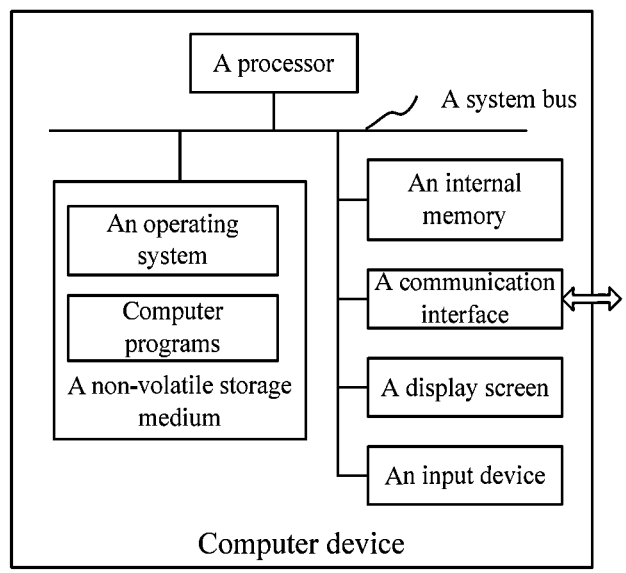
FIG. 9 is a diagram of an internal structure of a computer device in an embodiment.

A person skilled in the art can understand that the structure shown in FIG. 9 is only a block diagram of part of the structure related to the present disclosure, not constituting a limitation on the computer device to which the present disclosure is applied. Specific computer device may include more or fewer components than shown in the figures, or some components may be combined, or may have different component arrangements.

In an embodiment, a computer device is provided. The computer device may include a memory and a processor, wherein the memory stores a computer program, and the processor is configured to execute the computer program to implement the following steps: obtaining a target image frame corresponding to a target urban scene, and an adjacent image frame of the target image frame; locating a position of an object in the target image frame according to the target image frame and the adjacent image frame and obtaining an object point cloud, an object image and a coordinate transformation matrix corresponding to a target object; determining a global characteristic of the target object and parameters of surfaces to be selected of the target object according to the object point cloud and the object image; determining a characteristic of the surface to be selected according to the parameters of the surfaces to be selected and the global characteristic of the target object; determining a plane combination matrix of the target object according to the characteristic of the surface to be selected; and reconstructing a three-dimensional scene model of the target urban scene according to the plane combination matrix, the parameters of the surfaces to be selected and the coordinate transformation matrix.

In an embodiment, the processor is configured to execute the computer program to further implement the following steps: determining a scene point cloud corresponding to the target image frame according to the target image frame and the adjacent image frame; obtaining a corresponding image mask by instance segmentation of the target image frame; determining the object point cloud and the coordinate transformation matrix corresponding to the target object in the target image frame according to the scene point cloud and the image mask; and determining the object image corresponding to the target object according to the target image frame and the image mask.

In an embodiment, the processor is configured to execute the computer program to further implement the following steps: segmenting the scene point cloud according to the image mask to obtain an initial point cloud corresponding to the target object in the target image frame; and transferring the initial point cloud to a reconstructed coordinate system to obtain the object point cloud and the coordinate transformation matrix corresponding to the target object.

In an embodiment, the processor is configured to execute the computer program to further implement the following steps: determining a point cloud characteristic of the target object according to the object point cloud; determining an image characteristic of the target object according to the object image; and determining the global characteristic of the target object and the parameters of the surfaces to be selected of the target object according to the point cloud characteristic and the image characteristic.

In an embodiment, the processor is configured to execute the computer program to further implement the following steps: determining a weight of each surface to be selected of the target object in each unit of global information according to the parameters of the surfaces to be selected; and determining a characteristic of a corresponding surface to be selected according to the weight and the global characteristic.

In an embodiment, the processor is configured to execute the computer program to further implement the following steps: reconstructing a three-dimensional object model corresponding to the target object according to the plane combination matrix and the parameters of the surfaces to be selected and the coordinate transformation matrix; and reconstructing the three-dimensional scene model of the target urban scene according to the three-dimensional object model and the coordinate transformation matrix.

In an embodiment, the processor is configured to execute the computer program to further implement the following steps: multiplying the plane combination matrix by the parameters of the surfaces to be selected to obtain a convex package group; and reconstructing the three-dimensional object model corresponding to the target object according to the convex package group.

In an embodiment, a readable storage medium is provided. The readable storage medium has stored a computer program thereon, wherein the computer program is executed by a processor to implement the following steps: obtaining a target image frame corresponding to a target urban scene, and an adjacent image frame of the target image frame; locating a position of an object in the target image frame according to the target image frame and the adjacent image frame and obtaining an object point cloud, an object image and a coordinate transformation matrix corresponding to a target object; determining a global characteristic of the target object and parameters of surfaces to be selected of the target object according to the object point cloud and the object image; determining a characteristic of the surface to be selected according to the parameters of the surfaces to be selected and the global characteristic of the target object; determining a plane combination matrix of the target object according to the characteristic of the surface to be selected; and reconstructing a three-dimensional scene model of the target urban scene according to the plane combination matrix, the parameters of the surfaces to be selected and the coordinate transformation matrix.

In an embodiment, the computer program is executed by a processor to further implement the following steps: determining a scene point cloud corresponding to the target image frame according to the target image frame and the adjacent image frame; obtaining a corresponding image mask by instance segmentation of the target image frame; determining the object point cloud and the coordinate transformation matrix corresponding to the target object in the target image frame according to the scene point cloud and the image mask; and determining the object image corresponding to the target object according to the target image frame and the image mask.

In an embodiment, the computer program is executed by a processor to further implement the following steps: segmenting the scene point cloud according to the image mask to obtain an initial point cloud corresponding to the target object in the target image frame; and transferring the initial point cloud to a reconstructed coordinate system to obtain the object point cloud and the coordinate transformation matrix corresponding to the target object.

In an embodiment, the computer program is executed by a processor to further implement the following steps: determining a point cloud characteristic of the target object according to the object point cloud; determining an image characteristic of the target object according to the object image; and determining the global characteristic of the target object and the parameters of the surfaces to be selected of the target object according to the point cloud characteristic and the image characteristic.

In an embodiment, the computer program is executed by a processor to further implement the following steps: determining a weight of each surface to be selected of the target object in each unit of global information according to the parameters of the surfaces to be selected; and determining a characteristic of a corresponding surface to be selected according to the weight and the global characteristic.

In an embodiment, the computer program is executed by a processor to further implement the following steps: reconstructing a three-dimensional object model corresponding to the target object according to the plane combination matrix and the parameters of the surfaces to be selected and the coordinate transformation matrix; and reconstructing the three-dimensional scene model of the target urban scene according to the three-dimensional object model and the coordinate transformation matrix.

In an embodiment, the computer program is executed by a processor to further implement the following steps: multiplying the plane combination matrix by the parameters of the surfaces to be selected to obtain a convex package group; and reconstructing the three-dimensional object model corresponding to the target object according to the convex package group.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

A person skilled in the art can understand that all or part of the process in the method of the above embodiment can be accomplished by instructing the associated hardware by a computer program, which may be stored in a non-volatile computer readable storage medium. The computer program may include the process of each method in the above embodiments when executed. Any reference to a memory, a database or other medium used in each embodiment provided by the present disclosure may include at least one of a non-volatile memory and a volatile memory. The non-volatile memory may include read-only Memory (ROM), magnetic tape, floppy disk, flash or optical memory, etc. The volatile memory may include Random Access Memory (RAM) or external cache memory. As an illustration rather than a limitation, RAM may take many forms, such as Static Random Access Memory (SRAM) or Dynamic Random Access Memory (DRAM), etc.

The above-described embodiments are merely illustrative of several embodiments of the present disclosure, and the description thereof is relatively specific and detailed, but is not to be construed as limiting the scope of the disclosure. It should be noted that a plurality of variations and modifications may be made by those skilled in the art without departing from the spirit and scope of the disclosure. Therefore, the scope of the disclosure should be determined by the appended claims.

The above-described embodiments are merely illustrative of several embodiments of the present disclosure, and the description thereof is relatively specific and detailed, but is not to be construed as limiting the scope of the disclosure. It should be noted that a plurality of variations and modifications may be made by those skilled in the art without departing from the spirit and scope of the disclosure. Therefore, the scope of the disclosure should be determined by the appended claims.

What is claimed is:

1. A method for an urban scene reconstruction, wherein the method comprises:
    obtaining a target image frame corresponding to a target urban scene, and an adjacent image frame of the target image frame;
    determining a scene point cloud corresponding to the target image frame according to the target image frame and the adjacent image frame;
    obtaining a corresponding image mask by instance segmentation of the target image frame;

determining an object point cloud and a coordinate transformation matrix corresponding to a target object in the target image frame according to the scene point cloud and the image mask;

determining an object image corresponding to the target object according to the target image frame and the image mask;

determining a global characteristic of the target object and parameters of surfaces to be selected of the target object according to the object point cloud and the object image;

determining a characteristic to be selected according to the parameters of the surfaces to be selected and the global characteristic of the target object;

determining a plane combination matrix of the target object according to the characteristic of the surface to be selected; and reconstructing a three-dimensional scene model of the target urban scene according to the plane combination matrix, the parameters of the surfaces to be selected and the coordinate transformation matrix.

2. The method of claim 1, wherein the determining the object point cloud and the coordinate transformation matrix corresponding to the target object in the target image frame according to the scene point cloud and the image mask comprises:

segmenting the scene point cloud according to the image mask to obtain an initial point cloud corresponding to the target object in the target image frame; and transferring the initial point cloud to a reconstructed coordinate system to obtain the object point cloud and the coordinate transformation matrix corresponding to the target object.

3. The method of claim 1, wherein the determining the global characteristic of the target object and parameters of surfaces to be selected of the target object according to the object point cloud and the object image comprises:

determining a point cloud characteristic of the target object according to the object point cloud;

determining an image characteristic of the target object according to the object image; and determining the global characteristic of the target object and the parameters of the surfaces to be selected of the target object according to the point cloud characteristic and the image characteristic.

4. The method of claim 1, wherein the determining the characteristic of the surface to be selected according to the parameters of the surfaces to be selected and the global characteristic of the target object comprises:

determining a weight of each surface to be selected of the target object in each unit of global information according to the parameters of the surfaces to be selected; and determining a characteristic of a corresponding surface to be selected according to the weight and the global characteristic.

5. The method of claim 1, wherein the reconstructing the three-dimensional scene model of the target urban scene according to the plane combination matrix, the parameters of the surfaces to be selected and the coordinate transformation matrix comprises:

reconstructing a three-dimensional object model corresponding to the target object according to the plane combination matrix and the parameters of the surfaces to be selected and the coordinate transformation matrix; and reconstructing the three-dimensional scene model of the target urban scene according to the three-dimensional object model and the coordinate transformation matrix.

6. The method of claim 5, wherein the reconstructing the three-dimensional object model corresponding to the target object according to the plane combination matrix and the parameters of the surfaces to be selected and the coordinate transformation matrix comprises:

multiplying the plane combination matrix by the parameters of the surfaces to be selected to obtain a convex package group; and reconstructing the three-dimensional object model corresponding to the target object according to the convex package group.

7. A computer device comprising a memory and a processor, wherein the memory stores a computer program, and the processor is configured to execute the computer program to implement a method for an urban scene reconstruction comprising:

obtaining a target image frame corresponding to a target urban scene, and an adjacent image frame of the target image frame;

determining a scene point cloud corresponding to the target image frame according to the target image frame and the adjacent image frame;

obtaining a corresponding image mask by instance segmentation of the target image frame;

determining an object point cloud and a coordinate transformation matrix corresponding to a target object in the target image frame according to the scene point cloud and the image mask;

determining an object image corresponding to the target object according to the target image frame and the image mask;

determining a global characteristic of the target object and parameters of surfaces to be selected of the target object according to the object point cloud and the object image;

determining a characteristic of the surface to be selected according to the parameters of the surfaces to be selected and the global characteristic of the target object;

determining a plane combination matrix of the target object according to a characteristic of the surface to be selected; and reconstructing a three-dimensional scene model of the target urban scene according to the plane combination matrix, the parameters of the surfaces to be selected and the coordinate transformation matrix.

8. The computer device of claim 7, wherein the determining the object point cloud and the coordinate transformation matrix corresponding to the target object in the target image frame according to the scene point cloud and the image mask comprises:

segmenting the scene point cloud according to the image mask to obtain an initial point cloud corresponding to the target object in the target image frame; and transferring the initial point cloud to a reconstructed coordinate system to obtain the object point cloud and the coordinate transformation matrix corresponding to the target object.

9. The computer device of claim 7, wherein the determining the global characteristic of the target object and parameters of surfaces to be selected of the target object according to the object point cloud and the object image comprises:

determining a point cloud characteristic of the target object according to the object point cloud;

determining an image characteristic of the target object according to the object image; and determining the global characteristic of the target object and the parameters of the surfaces to be selected of the target object according to the point cloud characteristic and the image characteristic.

10. The computer device of claim 7, wherein the determining the characteristic of the surface to be selected according to the parameters of the surfaces to be selected and the global characteristic of the target object comprises:

determining a weight of each surface to be selected of the target object in each unit of global information according to the parameters of the surfaces to be selected; and determining a characteristic of a corresponding surface to be selected according to the weight and the global characteristic.

11. The computer device of claim 7, wherein the reconstructing the three-dimensional scene model of the target urban scene according to the plane combination matrix, the parameters of the surfaces to be selected and the coordinate transformation matrix comprises:

reconstructing a three-dimensional object model corresponding to the target object according to the plane combination matrix and the parameters of the surfaces to be selected and the coordinate transformation matrix; and reconstructing the three-dimensional scene model of the target urban scene according to the three-dimensional object model and the coordinate transformation matrix.

12. The computer device of claim 11, wherein the reconstructing the three-dimensional object model corresponding to the target object according to the plane combination matrix and the parameters of the surfaces to be selected and the coordinate transformation matrix comprises:

multiplying the plane combination matrix by the parameters of the surfaces to be selected to obtain a convex package group; and reconstructing the three-dimensional object model corresponding to the target object according to the convex package group.

13. A readable storage medium having stored a computer program thereon, wherein the computer program is executed by a processor to implement a method for an urban scene reconstruction comprising:

obtaining a target image frame corresponding to a target urban scene, and an adjacent image frame of the target image frame;

determining a scene point cloud corresponding to the target image frame according to the target image frame and the adjacent image frame;

obtaining a corresponding image mask by instance segmentation of the target image frame;

determining an object point cloud and a coordinate transformation matrix corresponding to a target object in the target image frame according to the scene point cloud and the image mask;

determining an object image corresponding to the target object according to the target image frame and the image mask;

determining a global characteristic of the target object and parameters of surfaces to be selected of the target object according to the object point cloud and the object image;

determining a characteristic of a surface to be selected according to the parameters of the surfaces to be selected and the global characteristic of the target object;

determining a plane combination matrix of the target object according to the characteristic of the surface to be selected; and reconstructing a three-dimensional scene model of the target urban scene according to the plane combination matrix, the parameters of the surfaces to be selected and the coordinate transformation matrix.

14. The readable storage medium of claim 13, wherein the determining the object point cloud and the coordinate transformation matrix corresponding to the target object in the target image frame according to the scene point cloud and the image mask comprises:

segmenting the scene point cloud according to the image mask to obtain an initial point cloud corresponding to the target object in the target image frame; and transferring the initial point cloud to a reconstructed coordinate system to obtain the object point cloud and the coordinate transformation matrix corresponding to the target object.

15. The readable storage medium of claim 13, wherein the determining the global characteristic of the target object and the parameters of the surfaces to be selected of the target object according to the object point cloud and the object image comprises:

determining a point cloud characteristic of the target object according to the object point cloud;

determining an image characteristic of the target object according to the object image; and determining the global characteristic of the target object and the parameters of the surfaces to be selected of the target object according to the point cloud characteristic and the image characteristic.

16. The readable storage medium of claim 13, wherein the determining the characteristic of the surface to be selected according to the parameters of the surfaces to be selected and the global characteristic of the target object comprises:

determining a weight of each surface to be selected of the target object in each unit of global information according to the parameters of the surfaces to be selected; and determining a characteristic of a corresponding surface to be selected according to the weight and the global characteristic.

17. The readable storage medium of claim 13, wherein the reconstructing the three-dimensional scene model of the target urban scene according to the plane combination matrix, the parameters of the surfaces to be selected and the coordinate transformation matrix comprises:

reconstructing a three-dimensional object model corresponding to the target object according to the plane combination matrix and the parameters of the surfaces to be selected and the coordinate transformation matrix; and reconstructing the three-dimensional scene model of the target urban scene according to the three-dimensional object model and the coordinate transformation matrix.

18. The readable storage medium of claim 17, wherein the reconstructing the three-dimensional object model corresponding to the target object according to the plane combination matrix and the parameters of the surfaces to be selected and the coordinate transformation matrix comprises:

multiplying the plane combination matrix by the parameters of the surfaces to be selected to obtain a convex package group; and reconstructing the three-dimensional object model corresponding to the target object according to the convex package group.

* * * * *